United States Patent
Taylor et al.

(10) Patent No.: US 10,148,663 B2
(45) Date of Patent: Dec. 4, 2018

(54) COMMUNICATION NETWORK STRUCTURE, METHOD OF INTERCONNECTING AUTONOMOUS COMMUNICATION NETWORKS AND COMPUTER PROGRAM IMPLEMENTING SAID METHOD

(71) Applicant: Airbus Defence and Space Limited, Stevenage, Hertfordshire (GB)

(72) Inventors: Stuart Taylor, West Sussex (GB); Tamzin Archer, Stevenage (GB)

(73) Assignee: Airbus Defence and Space Limited, Stevenage, Hertfordshire (GB)

(*) Notice: Subject to any disclaimer, the term of this patent is extended or adjusted under 35 U.S.C. 154(b) by 18 days.

(21) Appl. No.: 14/741,766

(22) Filed: Jun. 17, 2015

(65) Prior Publication Data
US 2015/0373025 A1  Dec. 24, 2015

(30) Foreign Application Priority Data

Jun. 18, 2014 (EP) .................................. 14002102

(51) Int. Cl.
*H04L 12/28* (2006.01)
*H04L 29/06* (2006.01)
*H04L 12/24* (2006.01)

(52) U.S. Cl.
CPC ............ *H04L 63/101* (2013.01); *H04L 12/28* (2013.01); *H04L 41/12* (2013.01); *H04L 41/22* (2013.01); *H04L 63/20* (2013.01); *H04L 41/28* (2013.01)

(58) Field of Classification Search
CPC ....... H04L 63/101; H04L 12/28; H04L 41/22; H04L 63/20; H04L 41/28
See application file for complete search history.

(56) References Cited

U.S. PATENT DOCUMENTS 6,690,675 B1 * 2/2004 Kung .................. H04L 29/06
370/401
8,406,798 B2 * 3/2013 Mao ..................... H04W 4/10
455/518

(Continued)

FOREIGN PATENT DOCUMENTS

EP      1 780 943 A1    5/2007
WO   WO 03/023636 A2   3/2003

OTHER PUBLICATIONS

European Search Report dated Dec. 3, 2014 (nine pages).

*Primary Examiner* — Maharishi V Khirodhar
(74) *Attorney, Agent, or Firm* — Crowell & Moring LLP

(57) ABSTRACT

A communication network structure, in particular data communication network structure, includes a plurality of autonomous communication networks. Each autonomous communication network has at least one network node. The node is connected to a common gateway. The common gateway is designed to selectively connect at least two of the nodes in order to provide intercommunication ability between the related communication networks. A method of interconnecting autonomous communication networks includes: selecting networks or network nodes to be interconnected from a list of available networks or network nodes or selecting a preset configuration of inter-node connections; activating an interconnection between the selected networks or network nodes by creating an access-list using the IP-addresses defined for each node; and applying the access-list on a router element provided in said gateway, thus connecting the nodes/networks to each other.

8 Claims, 3 Drawing Sheets

(56) References Cited

U.S. PATENT DOCUMENTS

| | | | |
|---|---|---|---|
| 8,634,815 B2* | 1/2014 | Chu | H04L 12/1818 |
| | | | 455/416 |
| 9,036,647 B2* | 5/2015 | Yeh | H04L 45/12 |
| | | | 370/401 |
| 9,774,746 B1* | 9/2017 | Sennett | H04M 7/124 |
| 2002/0110123 A1* | 8/2002 | Shitama | H04L 63/08 |
| | | | 370/389 |
| 2007/0127460 A1* | 6/2007 | Wilber | H04L 67/12 |
| | | | 370/389 |
| 2007/0280203 A1* | 12/2007 | Shaffer | H04L 12/66 |
| | | | 370/352 |
| 2008/0200162 A1* | 8/2008 | Chowdhury | H04L 12/1836 |
| | | | 455/422.1 |
| 2009/0003316 A1* | 1/2009 | Lee | H04L 12/5692 |
| | | | 370/352 |
| 2010/0246443 A1* | 9/2010 | Cohn | H04L 12/4641 |
| | | | 370/255 |
| 2011/0110268 A1 | 5/2011 | Panasyuk et al. | |
| 2011/0255530 A1* | 10/2011 | Chaturvedi | H04M 3/42314 |
| | | | 370/352 |
| 2013/0142059 A1* | 6/2013 | Di Girolamo | H04L 12/66 |
| | | | 370/252 |

* cited by examiner

COMMUNICATION NETWORK STRUCTURE, METHOD OF INTERCONNECTING AUTONOMOUS COMMUNICATION NETWORKS AND COMPUTER PROGRAM IMPLEMENTING SAID METHOD

CROSS REFERENCE TO RELATED APPLICATION

This application claims priority under 35 U.S.C. § 119 from European Patent Application No. 14 002 102.3-1853, filed Jun. 18, 2014, the entire disclosure of which is herein expressly incorporated by reference.

FIELD OF THE INVENTION

The present invention is directed to a communication network structure, in particular to a data communication network structure. It is further directed to a method of interconnecting autonomous communication networks, in particular autonomous data communication networks. The invention is further directed to a computer software implementing such a method.

BACKGROUND AND SUMMARY OF THE INVENTION

Communication networks, in particular data communication networks, are in use in nearly every organization or company. Usually, these autonomous networks are closed units interconnecting only members to this organization or company. However, there may be situations in which it is desired or even needed to interconnect two or more of these autonomous communication networks. The prior art in such a situation is that network specialists manually interconnect these autonomous networks—a work which requires special information technology skills and tools and which is time consuming. In urgent scenarios like emergency management scenarios neither these network specialists nor the necessary time are available. Such scenarios are, for example, unplanned situations necessitating an immediate response, like natural disasters (e.g. wildfires, flooding, earthquakes), man made disasters (e.g. industrial accidents, chemical plant accidents or nuclear plant accidents), major traffic accidents (e.g. airplane crashes, railroad accidents, like train derailments, or naval vessel collisions), riots or terrorist attacks, etc. In these situations it may be necessary to quickly interconnect communication networks of a plurality of organizations like the police forces, fire fighters, national or regional civil protection units, medical rescue and support organizations, government agencies or even military forces.

It would thus be helpful if the users participating in such a scenario had the ability to control access to their own network and to the networks of other participating organizations instantly. This requires that:

a. the control can be achieved without the need to involve technical specialists e.g. network engineers to apply a reconfiguration to network equipment or network planner using a traditional network management system;

b. it must be easy and intuitive enough for a non-technical user to operate;

c. the desired effect can be achieved very rapidly i.e. from less than three user interactions e.g. mouse clicks and without having to reference other information e.g. look up addresses.

The object of the present invention is to provide a communication network structure and a method of interconnecting autonomous communication networks, as well as a computer program implementing such a method enabling a user to quickly and instantly interconnect autonomous communication networks without the need of special information technology skills.

The object directed to the network structure is achieved by the communication network structure in accordance with embodiments of the invention.

The communication network structure according to embodiments of the invention is preferably a data communication network structure. It comprises a plurality of autonomous communication networks, in particular data communication networks, wherein each autonomous communication network comprises at least one network node, wherein said at least one node of each communication network is connected or connectable to a common gateway, and wherein said common gateway is designed to selectively connect at least two of said nodes in order to provide intercommunication ability between the related communication networks.

In a preferred embodiment of the communication network structure, the gateway is designed to have a plurality of predefined and preset configurations of inter-node connections and to allow a user to directly select and activate a preset configuration from the plurality of predefined and preset configurations.

In a further preferred embodiment of the communication network structure, the gateway is designed to allow a user to individually select and interconnect two or more network nodes from the plurality of autonomous communication networks.

It is also advantageous when the common gateway comprises at least one router element to which the nodes of the autonomous communication networks are selectively connected or connectable.

The object directed to the method of interconnecting autonomous communication networks is solved by embodiments of the invention.

This method, which is carried out in a communication network structure, comprises the steps of:

a) selecting networks or network nodes to be interconnected from a group or a list of available networks or network nodes or selecting a preset configuration of inter-node connections;

b) activating an interconnection between the selected networks or network nodes by creating an access-list using the IP-addresses defined for each node; and c) applying the access-list on a router element provided in the gateway, thus connecting the nodes/networks to each other.

Preferably, this method is implemented in a computer program which is running on a computer provided in the communication network structure, preferably in the gateway.

The basic idea of the invention is to provide a gateway between the autonomous communication networks potentially to be interconnected, and to provide a method, e.g. implemented in a computer program, enabling a user to quickly and instantly activate an interconnection between selected ones of the autonomous networks. The preferred solution is to offer to the user a graphic user interface on a computer display on which the user can establish the desired connections by one or more selection clicks (selecting one or more networks to be interconnected) and by one activation click activating the interconnection(s). The same procedure can be carried out for de-activating the connection(s) to one or more of the autonomous communication networks by selecting the network(s) to be disconnected and by a subsequent de-activation click.

Although the networks shown, described and defined in this document have a node, the invention is not delimited to networks of star topology. The invention may also be applied to other network topologies, e.g. ring topologies or bus topologies, having a dedicated node.

Other objects, advantages and novel features of the present invention will become apparent from the following detailed description of one or more preferred embodiments when considered in conjunction with the accompanying drawings.

DETAILED DESCRIPTION OF THE INVENTION

Figure 1:
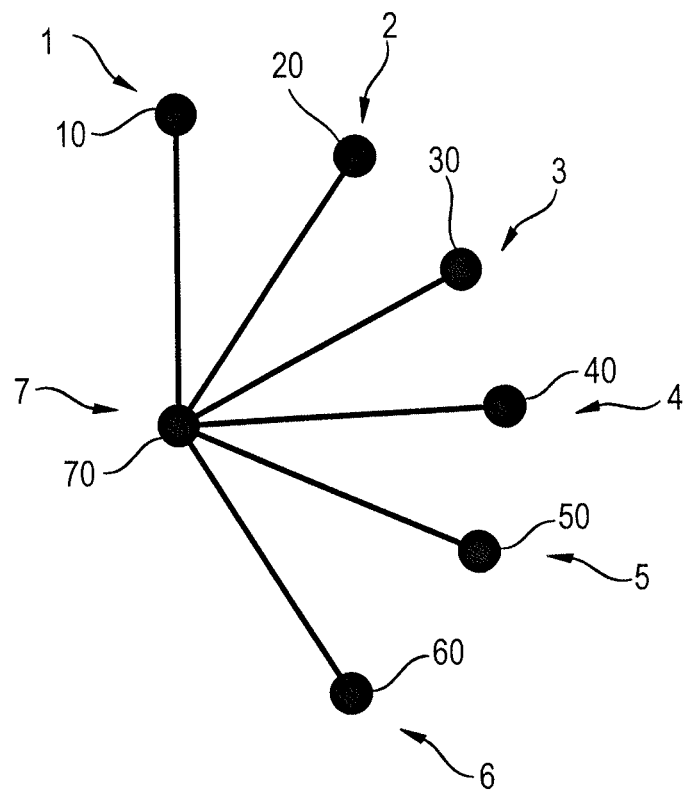
FIG. 1 shows a physical communication network structure according to an embodiment of the invention.

FIG. 1 schematically depicts a physical communication network structure with a plurality of autonomous communication networks, i.e. a Gold Command network 1 with a Gold Command network node 10, a COBR (Cabinet Office Briefing Room) network 2 with a COBR network node 20, a Special Forces network 3 with a Special Forces network node 30, a Fire Service network 4 with a Fire Service network node 40, an Environmental Agency network 5 with an Environmental Agency network node 50 and a Police network 6 with a Police network node 60. Each one of the nodes 10, 20, 30, 40, 50, 60 of these communication networks 1, 2, 3, 4, 5, 6 is connected to a router 70 provided in a common gateway 7.

A computer (not shown) is provided in the gateway 7 to control the router 70 by way of a computer program running on the computer. The computer program can be operated locally at the gateway or remotely via a secure connection by authenticated and authorised operators.

Figure 2:
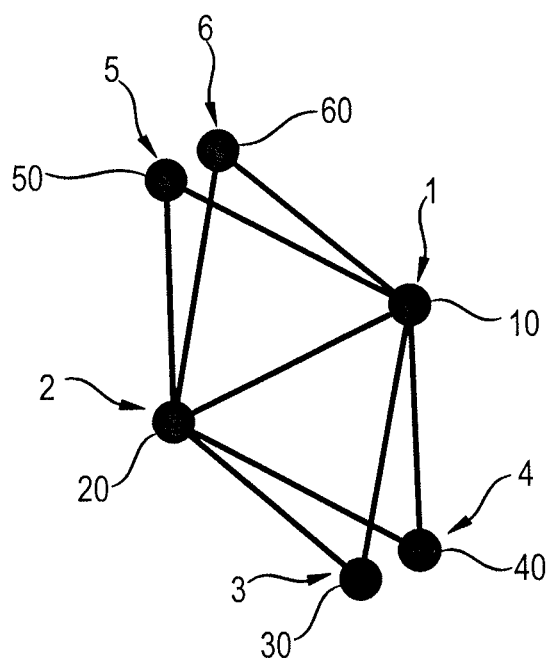
FIG. 2 shows a logical network established according to an exemplary method of the invention.

The router 70 can be configured, e.g. by the computer program, to interconnect two or more of the autonomous networks 1, 2, 3, 4, 5, 6 physically connected to the router 70. Autonomous networks interconnected in this way form a logical network shown in FIG. 2. The connecting lines between the nodes 10, 20, 30, 40, 50, 60 shown in FIG. 2 depict the respective interconnection between the networks associated to the respective nodes.

Figure 3:
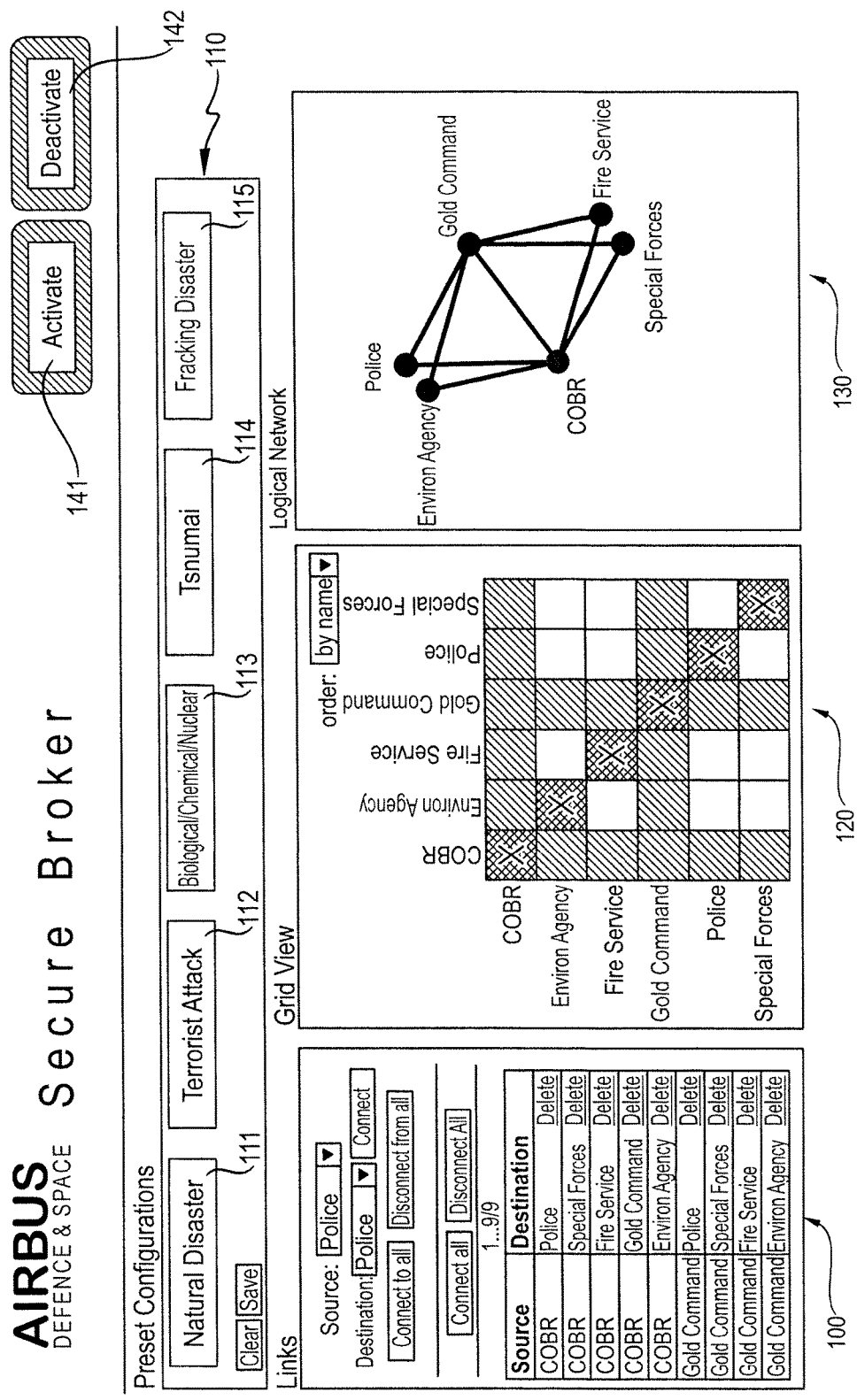
FIG. 3 shows a screenshot of a graphic user interface of an exemplary computer program of the invention.

The screenshot of the graphic user interface in FIG. 3 shows the controls for:

A. Creating a set of links in the 'Links' section 100;

B. Selecting presets and saving links as presets 111, 112, 113, 114, 115 in the 'Preset Configurations' section 110;

C. Representations of the network in a 'Grid View' section 120 and in a 'Logical Network' section 130; and D. Activation and deactivation buttons 141, 142 in the header 140.

The representation in the 'Grid View' indicates by the dark fields marked with a cross impossible connections of each network with itself. The hatched (dark) fields without a cross indicate selected interconnections, which are shown in the 'Logical Network' section 130. The remaining white fields represent possible connections, which are not selected in the shown example.

A user may—if a requested preset configuration is not available—manually select one or more network interconnection(s) by selecting networks to be connected from a list in the 'Links' section or by clicking on one or more field(s) in the 'Grid View' matrix. The interconnection(s) will then be activated/de-activated by subsequently clicking on the 'Activate' or 'Deactivate' button, respectively.

Figure 4:
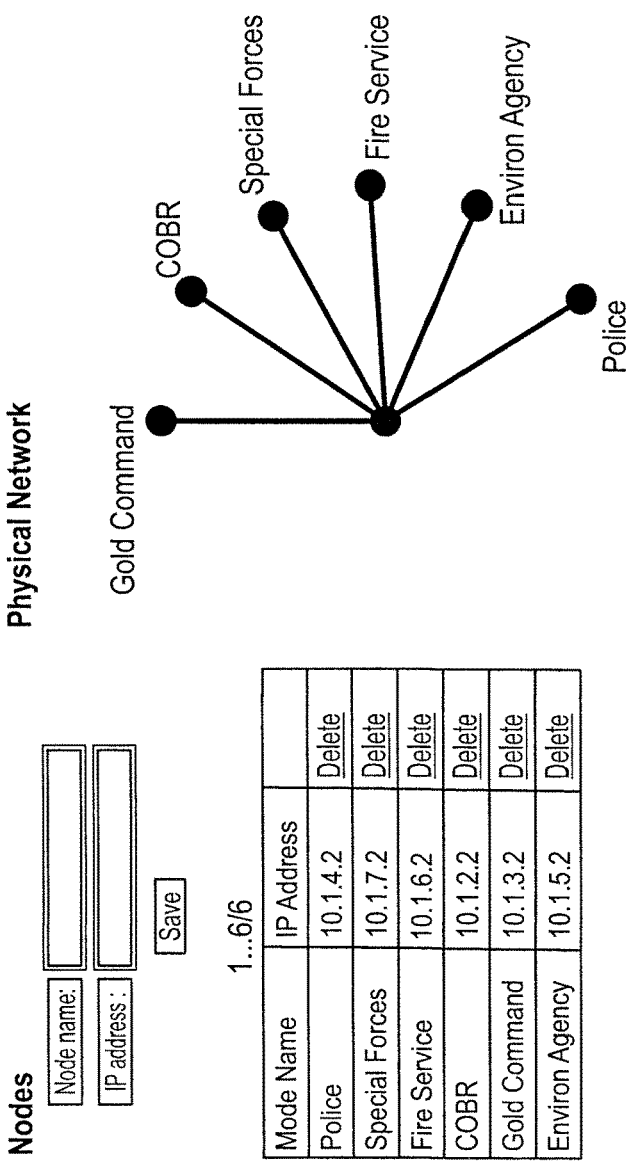
FIG. 4 shows another screenshot of a graphic user interface of an exemplary computer program of the invention.

The screenshot of the graphic user interface in FIG. 4 shows the controls for defining the nodes and a representation of the physical network with the nodes connected to the gateway. This user interface would be used as part of the system initialization and for maintenance processes.

The invention provides a computer program based solution that implements the technical processes of:

controlling and applying access lists on baseband router elements based on a logical network defined by the end user;

defining preset logical network configurations for immediate activation of pre-planned network interconnections;

activation of ad-hoc configurations;

deactivation preventing any connections across the managed network structure;

for a given node connecting to and disconnecting from all other nodes; and creating or removing individual links between the nodes.

According to the invention, a new logical network is formed by interconnecting physical networks in a much more rapid timescale by a business end user. This is achieved through the following process steps:

defining links between nodes either by selecting a preset configuration or ad-hoc selection;

presenting a representation of the logical network to the user in a variety of formats (listing table of interconnected or interconnectable networks, grid table of possible interconnections or logical network representation);

selecting an 'Activate' button by the user;

creating by the software an access-list based on the set of links using the IP addresses defined for each node, e.g. for a link between node with IP address 10.1.2.2 and node with IP address 10.1.3.2 by a command "permit ip host 10.1.2.2 host 10.1.3.2";

connecting to the baseband element e.g. to the router;

applying the access list on the router as the new configuration;

activating the new logical network; and reporting the result to the user.

The network structure and the method of the present invention may be applied to a broad variety of scenarios of which the following scenarios are given as examples.

Scenario 1—Government Agency Interconnections in Emergency Situations

A set of government agency networks are physically linked via a gateway that in normal situations is deactivated. In the case of emergency, e.g. natural disaster, the gateway can be activated by the software program of the invention in a configuration shown in FIG. 2 and FIG. 3 selecting, e.g., the Cabinet Office Briefing Room (COBR) connected to a Gold Command which is connected to Police, Fire Service, and Environment Agency. When the crisis is passed the gateway can be deactivated to return to the default state. In the software this would involve the user selecting the pre-planned configuration and selecting 'Activate', and at the end of the emergency situation selecting 'Deactivate'.

Scenario 2—Remote Removal of a Compromised Node

If, for example, a police station was overrun by external forces, terrorists or riots and is thus compromised, the system managing network access for the police force could allow an authorized user of the police forces to remove all access from the compromised police station instantly from their central command post. In the software this would involve the user selecting the compromised police station within the police communication network, selecting 'Disconnect from All' and selecting 'Activate'.

Scenario 3—Prioritizing Limited Bandwidth on Naval Vessels

Seamen on board a ship are provided network access via 3G hubs in their areas of the vessel primarily for internet access. At times when bandwidth is limited and is required for higher priority operational needs this system could be used to virtually disconnect the individual hubs as required, and reconnect when appropriate.

Reference numerals in the claims, in the description and in the drawings are provided only for a better understanding of the invention and shall not delimit the scope of protection which is defined by the wording and meaning of the claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A data communication network structure, comprising:
a plurality of physically autonomous data communication networks, including a first autonomous data communication network comprising a first network node, a second autonomous data communication network comprising a second network node, and a third autonomous data communication network comprising a third network node,
wherein the first network node, the second network node, and the third network node are connected to a common gateway;
wherein the first network node controls said common gateway to selectively connect the second network node with the third network node;
wherein said common gateway is configured to have a plurality of predefined and preset configurations of inter-node connections and to allow a user of the first network node to directly select and activate a preset configuration from said plurality of predefined and preset configurations; and
wherein the common gateway is activated only during a crisis, and the common gateway is deactivated when there is no crisis, such that there are no connections between the network nodes when the common gateway is deactivated.

2. The data communication network structure according to claim 1, wherein said common gateway is configured to allow a user to individually select and interconnect two or more network nodes from said plurality of autonomous data communication networks.

3. The data communication network structure according to claim 2, wherein said common gateway comprises at least one router element to which said nodes of said autonomous data communication networks are selectively connected.

4. The data communication network structure according to claim 1, wherein said common gateway is configured to allow a user to individually select and interconnect two or more network nodes from said plurality of autonomous data communication networks.

5. The data communication network structure according to claim 1, wherein said common gateway comprises at least one router element to which the first, second and third network nodes of said autonomous data communication networks are selectively connected.

6. The data communication network structure according to claim 1, wherein the first network node is configured to disconnect the second autonomous data communication network from all access to the data communication network structure.

7. The data communication network structure according to claim 1, wherein the first network node is configured to selectively disconnect network nodes of the second autonomous data communication network from the data communication network structure.

8. The data communication network structure according to claim 1, wherein the first network node controls said common gateway to selectively connect the second network node with the third network node by:
activating an interconnection between the second network node with the third network node by creating an access-list using IP-addresses defined for each node; and
applying the access-list on a router element provided in said gateway.

* * * * *